No. 801,717. PATENTED OCT. 10, 1905.
Y. D. HANCE.
HUB ATTACHMENT.
APPLICATION FILED DEC. 9, 1904.
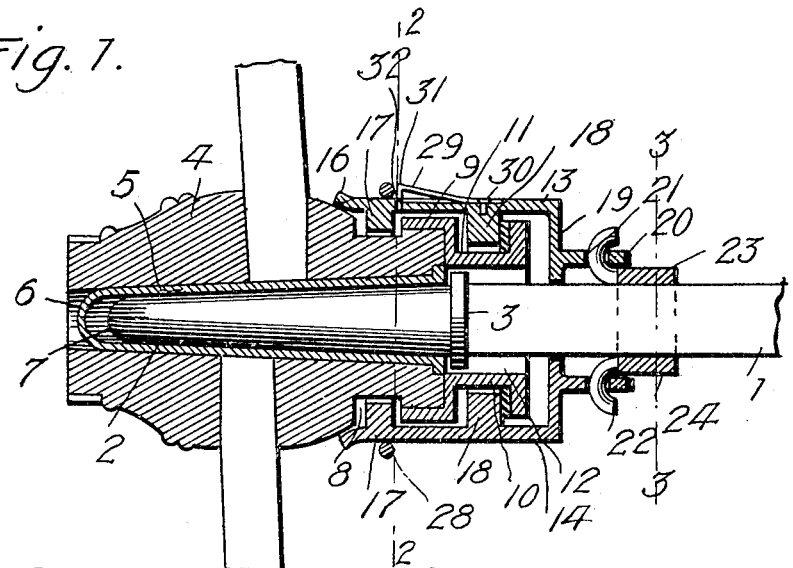
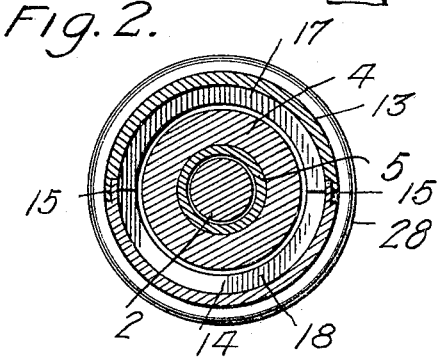
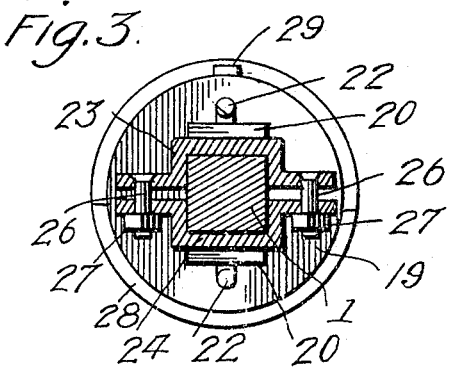
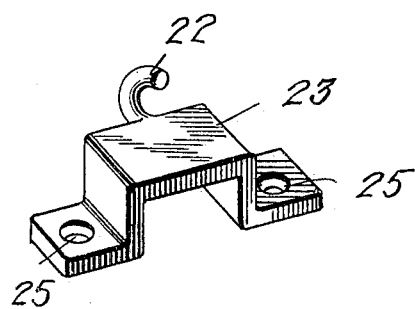

UNITED STATES PATENT OFFICE.

YOUNG D. HANCE, OF ADELINA, MARYLAND.

HUB ATTACHMENT.

No. 801,717. Specification of Letters Patent. Patented Oct. 10, 1905.

Application filed December 9, 1904. Serial No. 236,171.

*To all whom it may concern:*

Be it known that I, YOUNG D. HANCE, a citizen of the United States, residing at Adelina, in the county of Calvert and State of Maryland, have invented new and useful Improvements in Hub Attachments, of which the following is a specification.

This invention relates to means for securing the hubs of vehicle-wheels upon the axle-spindles and preventing the entrance of dust, sand, and other foreign substances between the spindles and boxes of the hubs, the object of the invention being to provide combination means which will subserve these two purposes and which may be readily applied and removed and will at the same time do away with the necessity of employing nuts and other threaded connections for retaining the vehicle-wheel on its spindle.

With this and other objects in view the invention consists of the features of construction, combination, and arrangement of parts hereinafter fully described, reference being had to the accompanying drawings, in which—

Figure 1 is a vertical longitudinal section through a vehicle-hub, showing the application of my invention. Figs. 2 and 3 are cross-sections taken, respectively, on the line 2 2 and the line 3 3 of Fig. 1; and Fig. 4 is a detail view of one of the clip or coupling sections employed to secure the holder and guard to the axle.

Referring now more particularly to the drawings, the numeral 1 denotes a vehicle-axle, and 2 its spindle, which is provided, as usual, at its inner end with a fixed sand-collar 3. On the spindle 2 is mounted a vehicle-hub 4, provided with a box 5 to receive the spindle 2, the outer end of said box being closed, as shown at 6, and the spindle having a blunt end 7, terminating somewhat short of said closed end 6, this construction of the box preventing the entrance of dust, sand, and other foreign substances from the outer side of the hub.

The hub 4 is provided at its inner end with an annular groove or recess 8 and receives the socket portion 9 of a fixed fastening member 10, rigidly secured by its said socket member 9 to the hub and provided at its inner end with an annular groove 11 and a passage 12 to receive the outer end of the axle 1 and the collar 3 thereon, which latter fits close to the inner ends of the hub and box 5.

Surrounding the inner portion of the axle is a combined fastening device and guard consisting of a casing formed of two semicylindrical sections 13 and 14, the edges of said sections being arranged to form a lap-joint or tongue-and-groove connection, as indicated at 15, to exclude dust, sand, and other foreign substances when said casing is closed about the hub. The outer end of the casing projects beyond the groove 8 and is outwardly flared, as shown at 16, to fit over the hub, and the sections 13 and 14 are provided with sets of ribs 17 and 18, disposed upon the inner sides thereof and coacting to produce when the casing is closed annular locking projections, which project into the grooves 8 and 11, formed in the hub, and fixed fastening device 10 to hold the hub from outward movement on the spindle 2, while permitting it to freely revolve. The inner ends of the casing-sections 13 and 14 have inwardly-projecting flanges 19, which closely surround the axle just in rear of the fastening device 10, and thereby form a complete closure to prevent any foreign substances from working into the space between the box and spindle, so that oil may freely circulate through and between the bearing parts without liability of becoming contaminated or taking up substances liable to cut or otherwise injure the said bearing parts. Extending inwardly from the flanges 19 are ears 20, which are spaced from the inner ends of said flanges and formed with eyes or openings 21. These eyes or openings 21 receive retaining-hooks 22, formed upon a clip or coupling engaging the axle 1, said clip comprising two half-socket sections 23 and 24 of the form shown in Figs. 3 and 4, each of said sections carrying a hook 22 and having laterally-projecting apertured eyes 25, receiving bolts 26, carrying nuts 27, whereby said clip or coupling is detachably connected with the axle 1. By this construction the inner ends of the sections of the casing composing the locking member and guard are held closed and secured to the axle.

In order to hold the forward or body portions of the casing-sections 13 and 14 closed, a ring or sleeve 28 is employed and is adapted to be slipped over upon the same from the axle and lie in line with the engaging rib 17 to hold the latter projected into the groove 8. To retain the ring in locking position, a spring-latch 29 is employed and is secured at its inner end by a screw or like fastening 30 to the section 13 and bent at its outer end to form a shoulder 31, which is movable in an opening 32, formed in said section 13. When the ring is slipped outwardly over the casing 12, it presses the outer end of the spring inwardly, the spring resuming its normal position after the ring has passed the same and presenting its shoulder 31 to lock the ring against inward movement and disconnection. When it is desired to remove the fastener and guard, the spring 29 is pressed inward, the ring slipped off the fastener and guard, and the sections 13 and 14 of the latter then disengaged from the hooks 21. By this construction the fastener and guard may be quickly and conveniently applied and removed and when in applied position will serve, as before described, the double function of securing the hub on its spindle and preventing the access of foreign substances between the hub and its bearing-box.

An improved advantage of my invention resides in the fact that it not only prevents the access of foreign substances, but does away with the necessity of providing the spindle with a threaded end and employing a nut in connection therewith to hold the hub from removal.

From the foregoing description, taken in connection with the accompanying drawings, the construction and mode of operation of the invention will be understood without a further extended description. Changes in the form, proportions, and minor details of construction may be made within the scope of the invention without departing from the spirit or sacrificing any of the advantages thereof.

Having thus described the invention, what is claimed as new, and desired to be secured by Letters Patent, is—

1. In combination with an axle and its spindle, a vehicle-hub mounted on the spindle, said hub being provided with a groove at its inner end, a stationary grooved fastening member upon the inner end of the hub, a sectional casing provided with projections engaging the groove in the hub and said grooved fastening member, means for holding said casing in closed position about the hub and fastening member, and interlocking connections between the axle and casing-sections from which said sections may be disconnected by a pivotal movement.

2. In combination with an axle and its spindle, a hub mounted on the spindle, a sectional guard or casing inclosing the inner end of the hub and holding it on the spindle, said casing being provided upon its sections with apertured ears, means for holding the sections of the casing in assembled relation, and a clip upon the axle provided with retaining-hooks engaging the apertured ears to secure the casing to the axle.

3. In combination with an axle and its spindle, a vehicle-hub mounted on the spindle, said hub being provided with a groove at its inner end, a stationary grooved fastening member secured to the inner end of the hub, a sectional casing provided with projections engaging the groove in the hub and said grooved fastening member, means for holding said casing in closed position about the hub and fastening member, and means for connecting the casing to the axle.

4. In combination with an axle and its spindle, a hub mounted upon the spindle, a sectional clip mounted upon the axle and provided with retaining-hooks, a casing inclosing the inner end of the hub and holding it upon the spindle, said casing composed of sections provided with apertured ears detachably engaging the retaining-hooks of the clips, and means for holding the casing-sections in assembled relation.

5. The combination with an axle and its spindle, a vehicle-hub mounted upon the spindle, said hub being provided with a groove at its inner end, a stationary grooved fastening member upon the inner end of the hub, a sectional casing provided with projections engaging the grooves in the hub and fastening member and provided upon its sections with apertured ears, a slidable retainer for holding the sections of the casing closed about the hub, a latch for holding said retainer in engaging position, and a sectional clip upon the axle provided with retaining-hooks engaging the apertured ears of the casing-sections.

In testimony whereof I affix my signature in presence of two witnesses.

YOUNG D. HANCE.

Witnesses:
C. C. HINES,
JOHN F. BYRNE.